US 9,167,491 B2
Oct. 20, 2015

(12) United States Patent
Otte et al.

(54) METHOD AND APPARATUS FOR WINDOW SIZE SELECTION TO OPTIMIZE INTER RAT HANDOVER

(75) Inventors: Kurt William Otte, Erie, CO (US); Masakazu Shirota, Kohama (JP)

(73) Assignee: QUALCOMM Incorporated, San Diego, CA (US)

(*) Notice: Subject to any disclaimer, the term of this patent is extended or adjusted under 35 U.S.C. 154(b) by 347 days.

(21) Appl. No.: 13/197,018

(22) Filed: Aug. 3, 2011

(65) Prior Publication Data

US 2012/0040675 A1    Feb. 16, 2012

Related U.S. Application Data

(60) Provisional application No. 61/373,352, filed on Aug. 13, 2010, provisional application No. 61/379,079, filed on Sep. 1, 2010.

(51) Int. Cl.
*H04W 4/00* (2009.01)
*H04W 36/00* (2009.01)
*H04W 36/14* (2009.01)
*H04W 48/16* (2009.01)
*H04W 88/06* (2009.01)

(52) U.S. Cl.
CPC .......... *H04W 36/0088* (2013.01); *H04W 36/14* (2013.01); *H04W 48/16* (2013.01); *H04W 88/06* (2013.01)

(58) Field of Classification Search
CPC . H04W 80/04; H04W 36/18; H04W 36/0011; H04W 36/14; H04W 36/08
USPC .................. 370/328, 329, 330, 331
See application file for complete search history.

(56) References Cited

U.S. PATENT DOCUMENTS 6,775,252 B1 * 8/2004 Bayley .......................... 370/328
6,957,068 B2   10/2005 Hutchison et al.
(Continued)

FOREIGN PATENT DOCUMENTS

WO        03096727       11/2003
WO    2008078694 A1       7/2008
WO    2009139933         11/2009

OTHER PUBLICATIONS

3rd Generation Partnership Project: "3GPP TR 23.882 V8.0.0, Technical Specification Group Services and System Aspects, 3GPP System Architecture Evolution: Report on Technical Options and Conclusions (Release 8)", 3GPP, No. V8.0.0, Sep. 1, 2008, pp. 154-159, XP002663493.

(Continued)

*Primary Examiner* — Hassan Phillips
*Assistant Examiner* — Siren Wei
(74) *Attorney, Agent, or Firm* — Darren M. Simon

(57) ABSTRACT

A method, an apparatus, and a computer program product for wireless communication are provided in which a system for optimizing pilot search window size selection for inter RAT handovers is implemented. An IWS may receive a message including at least one measurement value for each 1x pilot PN in a 1x network, obtained from measurements requested by an eNB and performed by a UE. The IWS may select one or more parameters for pilot search based on the at least one measurement value for the UE to use for pilot searching in the 1x network. Further the IWS may transmit the selected one or more parameters for pilot search to the UE for pilot searching in the 1x network.

34 Claims, 10 Drawing Sheets

(56) References Cited

U.S. PATENT DOCUMENTS

| | | | |
|---|---|---|---|
| 7,058,399 B2* | 6/2006 | Klein et al. | 455/424 |
| 2003/0060201 A1* | 3/2003 | Soliman | 455/442 |
| 2005/0020264 A1* | 1/2005 | Akao et al. | 455/436 |
| 2005/0232199 A1* | 10/2005 | Liu et al. | 370/331 |
| 2007/0229355 A1* | 10/2007 | Han et al. | 342/419 |
| 2009/0274122 A1* | 11/2009 | Wu | 370/331 |
| 2009/0316649 A1* | 12/2009 | Chen | 370/331 |
| 2010/0067487 A1 | 3/2010 | Makabe | |
| 2010/0195568 A1* | 8/2010 | Iimori | 370/328 |
| 2010/0297995 A1* | 11/2010 | Macias et al. | 455/435.2 |
| 2010/0317378 A1* | 12/2010 | Fang et al. | 455/466 |
| 2011/0014919 A1 | 1/2011 | Otte et al. | |
| 2011/0053600 A1 | 3/2011 | Rajasimman et al. | |
| 2011/0077011 A1 | 3/2011 | Wang et al. | |
| 2011/0122809 A1 | 5/2011 | Yun et al. | |
| 2011/0176536 A1* | 7/2011 | De Franca Lima et al. | 370/352 |

OTHER PUBLICATIONS

"3rd Generation Partnership Project; Technical Specification Group Radio Access Network; Improved Network Controlled Mobility between E-UTRAN and 3GPP2/Mobile WiMAX Radio Technologies (Release 9)", 3GPP Standard; 3GPP TR 36.938, 3rd Generation Partnership Project (3GPP), Mobile Competence Centre; 650, Route Des Lucioles; F-06921 Sophia-Antipolis Cedex; France, No. V9.0.0, Dec. 21, 2009, pp. 1-34, XP050401521, [retrieved on Dec. 21, 2009] pp. 10-14, paragraph 6.2.3.1-6.2.3.3.

International Search Report and Written Opinion—PCT/US2011/047683—ISA/EPO—Mar. 5, 2012.

Partial International Search Report—PCT/US2011/047683—ISA/EPO—Dec. 7, 2011.

* cited by examiner

METHOD AND APPARATUS FOR WINDOW SIZE SELECTION TO OPTIMIZE INTER RAT HANDOVER

CROSS-REFERENCE TO RELATED APPLICATION(S)

This application claims the benefit of U.S. Provisional Application Ser. No. 61/373,352, entitled "A Method and Apparatus for Pilot Search Window Size Determination in Traffic Channel Assignment Process for Inter RAT Handover" and filed on Aug. 13, 2010, and U.S. Provisional Application Ser. No. 61/379,079, entitled "A Method and Apparatus for Pilot Search Window Size Determination in Traffic Channel Assignment Process for Inter RAT Handover" and filed on Sep. 1, 2010, which are expressly incorporated by reference herein in its entirety.

BACKGROUND

1. Field

The present disclosure relates generally to communication systems, and more particularly, to a system and method to optimize pilot search window size selection during inter radio access technology (RAT) communications.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in relation to optimizing pilot search window size selection during inter RAT communications. According to one aspect, a method in wireless communications is provided. The method can include receiving, by an interworking solution (IWS), a message including at least one measurement value for each 1x pilot pseudo-noise (PN) in a 1x network, obtained from measurements requested by an evolved nodeB (eNB) and performed by a user equipment (UE). Further, the method can include selecting one or more parameters for pilot search based on the at least one measurement value for the UE to use for pilot searching in the 1x network. Moreover, the method can include transmitting the selected one or more parameters for pilot search to the UE for pilot searching in the 1x network.

Another aspect relates to an apparatus. The apparatus can include a processing system configured to receive, by an IWS, a message including at least one measurement value for each 1x pilot PN in a 1x network, obtained from measurements requested by an eNB and performed by a UE. Further, the processing system may be configured to select one or more parameters for pilot search based on the at least one measurement value for the UE to use for pilot searching in the 1x network. Moreover, the processing system may be configured to transmit the selected one or more parameters for pilot search to the UE for pilot searching in the 1x network.

Another aspect relates to a computer program product comprising a computer-readable medium. The computer-readable medium comprising code for receiving, by an IWS, a message including at least one measurement value for each 1x pilot PN in a 1x network, obtained from measurements requested by an eNB and performed by a UE. Further, the computer-readable medium may comprise code for selecting one or more parameters for pilot search based on the at least one measurement value for the UE to use for pilot searching in the 1x network. Moreover, the computer-readable medium may comprise code for transmitting the selected one or more parameters for pilot search to the UE for pilot searching in the 1x network.

Yet another aspect relates to an apparatus. The apparatus may comprise means for receiving, by an IWS, a message including at least one measurement value for each 1x pilot PN in a 1x network, obtained from measurements requested by an eNB and performed by a UE. Further, the apparatus may include means for selecting one or more parameters for pilot search based on the at least one measurement value for the UE to use for pilot searching in the 1x network. Moreover, the apparatus may include means for transmitting the selected one or more parameters for pilot search to the UE for pilot searching in the 1x network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
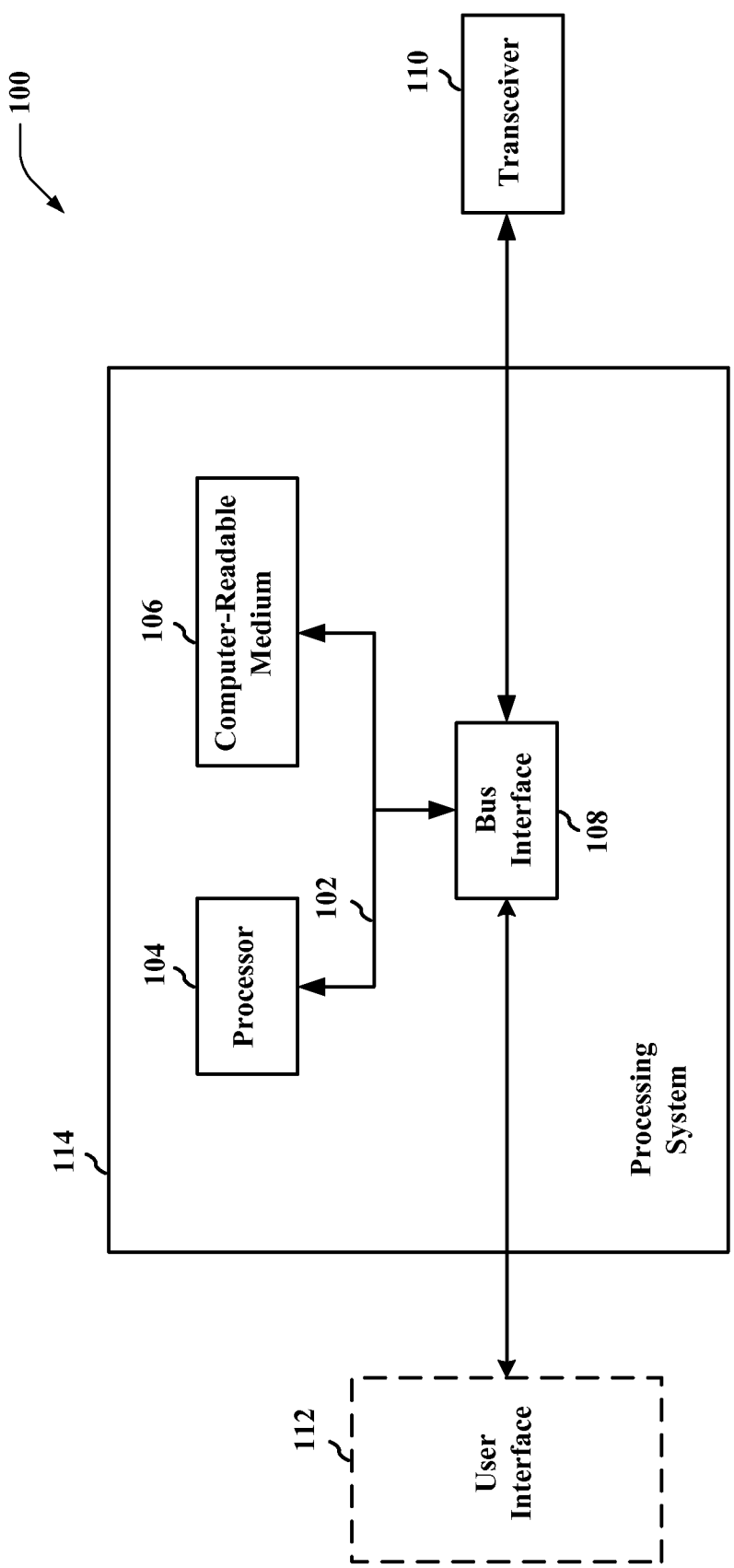
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
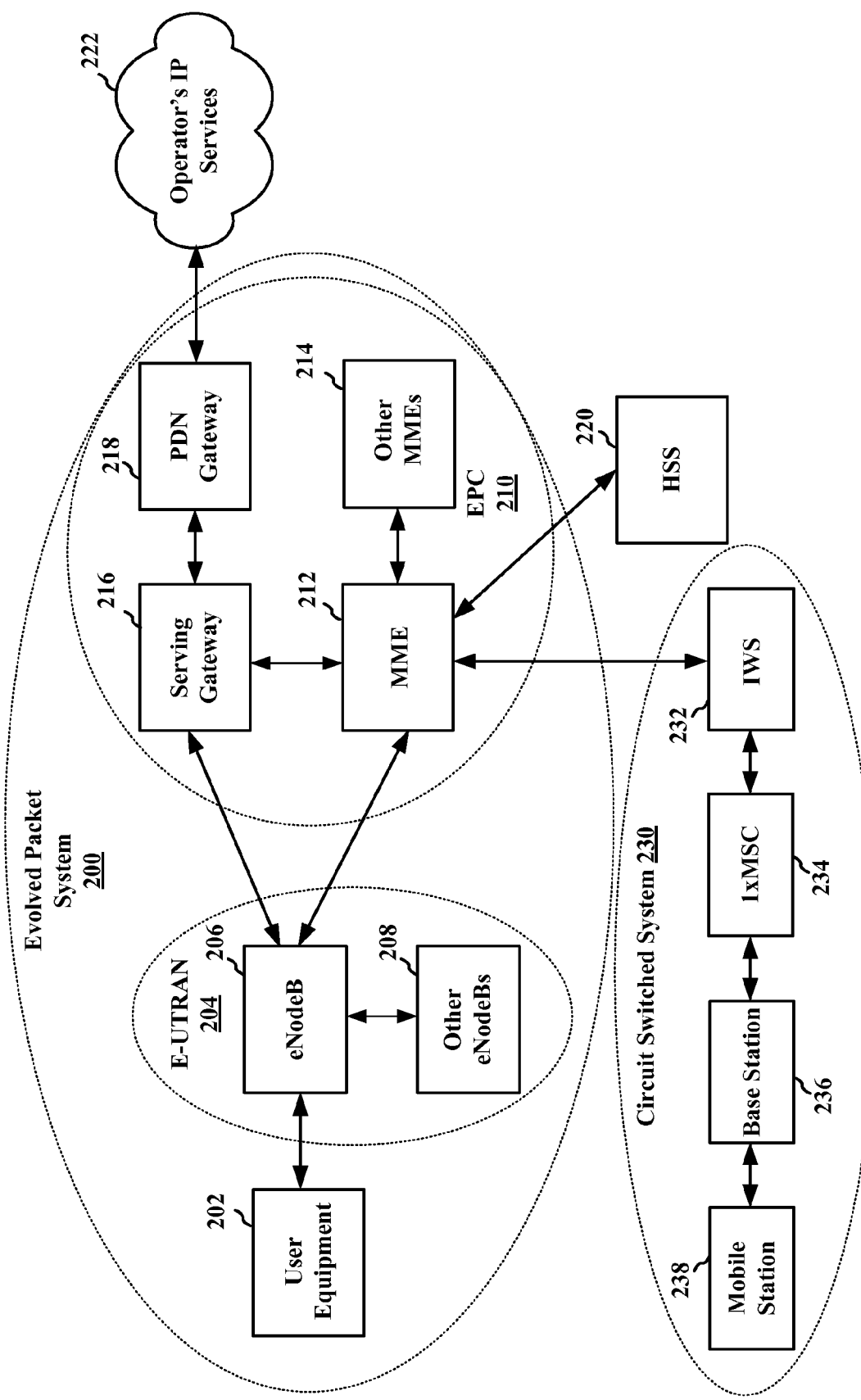
FIG. 2 is a diagram illustrating an example of a network architecture.

FIG. 2 is a diagram illustrating an Enhanced Packet System architecture 200 employing various apparatuses 100 (See FIG. 1). The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, such as a circuit switched network 230. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

Figure 4:
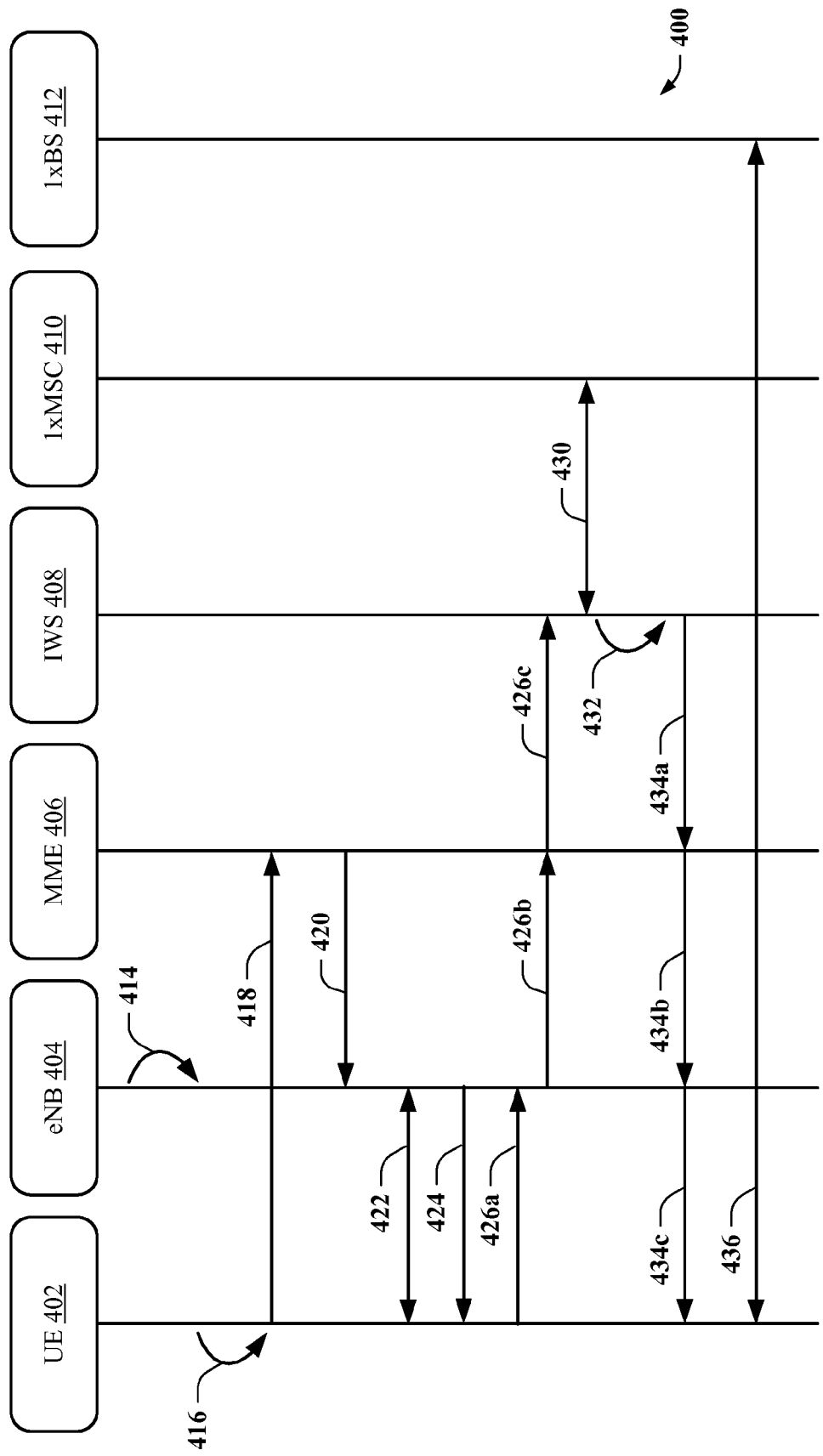
FIG. 4 is a call flow diagram describing an example system for optimizing pilot search window size selection for inter RAT communications according to an aspect.
Figure 5:
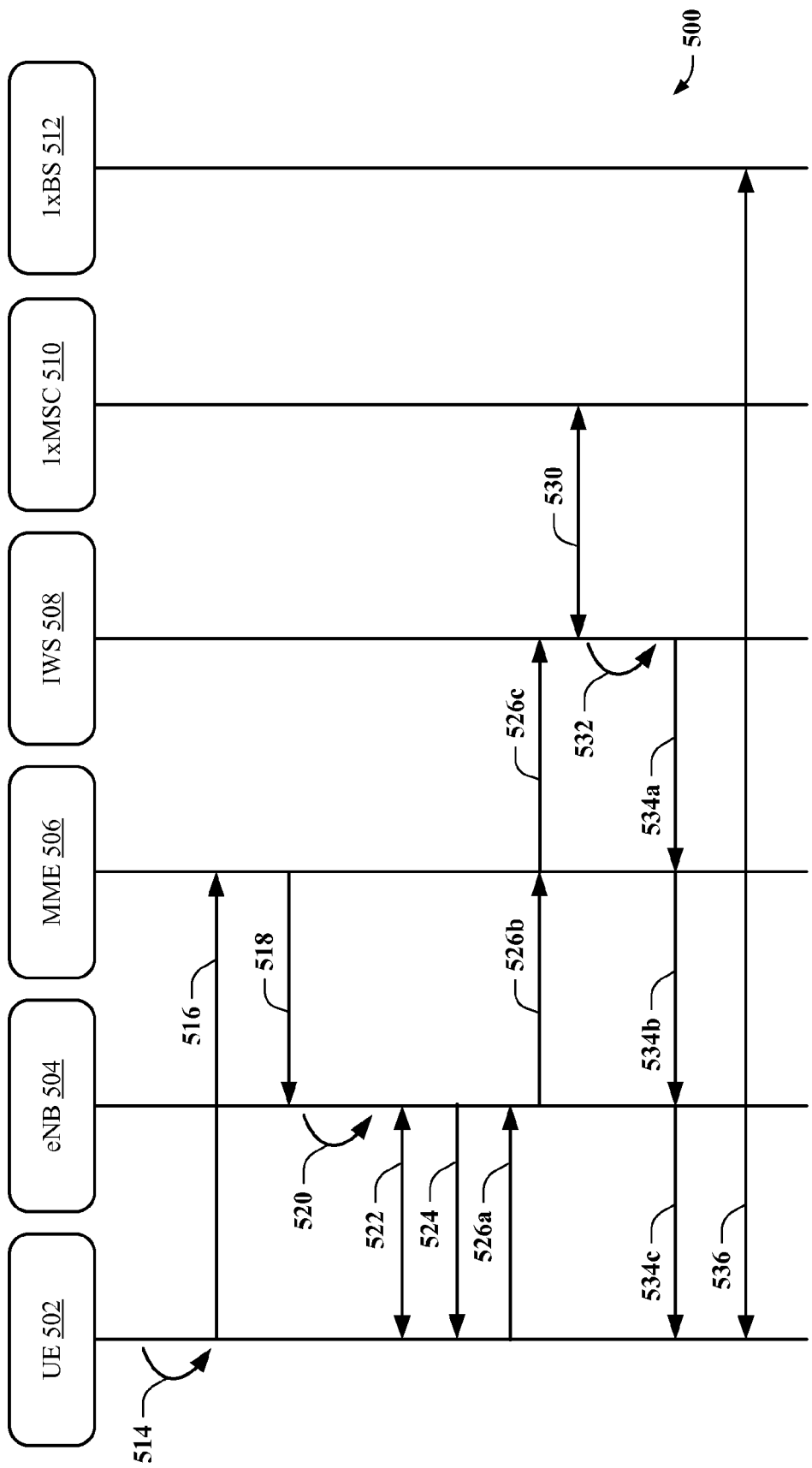
FIG. 5 is a call flow diagram describing another example system for optimizing pilot search window size selection for inter RAT communications according to an aspect.

The circuit switched system 230 includes an interworking solution (IWS) 232, a mobility switching center (MSC) 234, a base station 236, and a mobile station 238. In one aspect, circuit switched system 230 may communicate with EPS 200 through the IWS 232 and MME 212. FIGS. 4 and 5 discuss various operational processes in which the circuit switched system 230 may communicate with the EPS 200. In one aspect, handover of the UE 202 may occur between the circuit switched system 230 and the EPS 200. In one aspect, such handover may be associated with 1x circuit switch fallback (1xCSFB). In another aspect, the similar processes discussed in FIGS. 4 and 5 may be applicable to inter RAT communications for an evolved high rate packet data (eHRPD) optimized handover.

Generally in Circuit Switched System 230, Mobile Station 238 uses a pilot search window size provided from the Base Station 236. If the window size is large, the possibility of finding the best pilot could be increased, but such a window sizing may result in unnecessarily long times and as such, prolong a call set up time. Window size may be optimized based on various factors associated with the radio environment, e.g., the size of cell, delay spread of radio propagation, repeaters existence, etc. Optimization factors may be deferent in each cell site. In a 1x Circuit Switch Fall Back (1xCSFB) procedure, the IWS 232 may pick up Pilot PN for channel assignment based on the measurement report from the UE 202. In one aspect, the IWS 232 may be co-located with 1xBSC 236, or a standalone entity. If the IWS 232 is collocated with the 1xBSC 236, the IWS may determine window sizes for cell sites which are associated with 1xBSC 236. However, if IWS 232 is a standalone entity, the search window size of each 1x base station 236 may not be configured in IWS 232. Further, a window size selection is made before UE 202 tunes to the circuit switched system 230 to acquire a 1x traffic channel. Several ways to obtain the window size include, use of a parameter in SIB8, use of a measurement object in RRC Connection Reconfiguration, use of a cdma2000 parameters message, use of a 1x channel assignment message (UHDM), etc. Some of these options are managed by the eNB 204. In these options, the largest window size among PNs covered by the eNB 204 may be selected because only one value can be included. Other options are managed by IWS 232. In one aspect, window size values provided by eNB 204 and IWS 232 may not be in synchronization because keeping synchronization may be a burdensome operation. As such, the UE 202 may not be provided with the optimized window size for a channel. In other words, if the eNB 204 and IWS 232 are not in sync, the window size set by eNB 204 may not be the optimized for a channel assigned by IWS 232. Various schemes to optimize pilot search window size selection for inter RAT communications are discussed in detail with respect to FIGS. 4 and 5.

Figure 3:
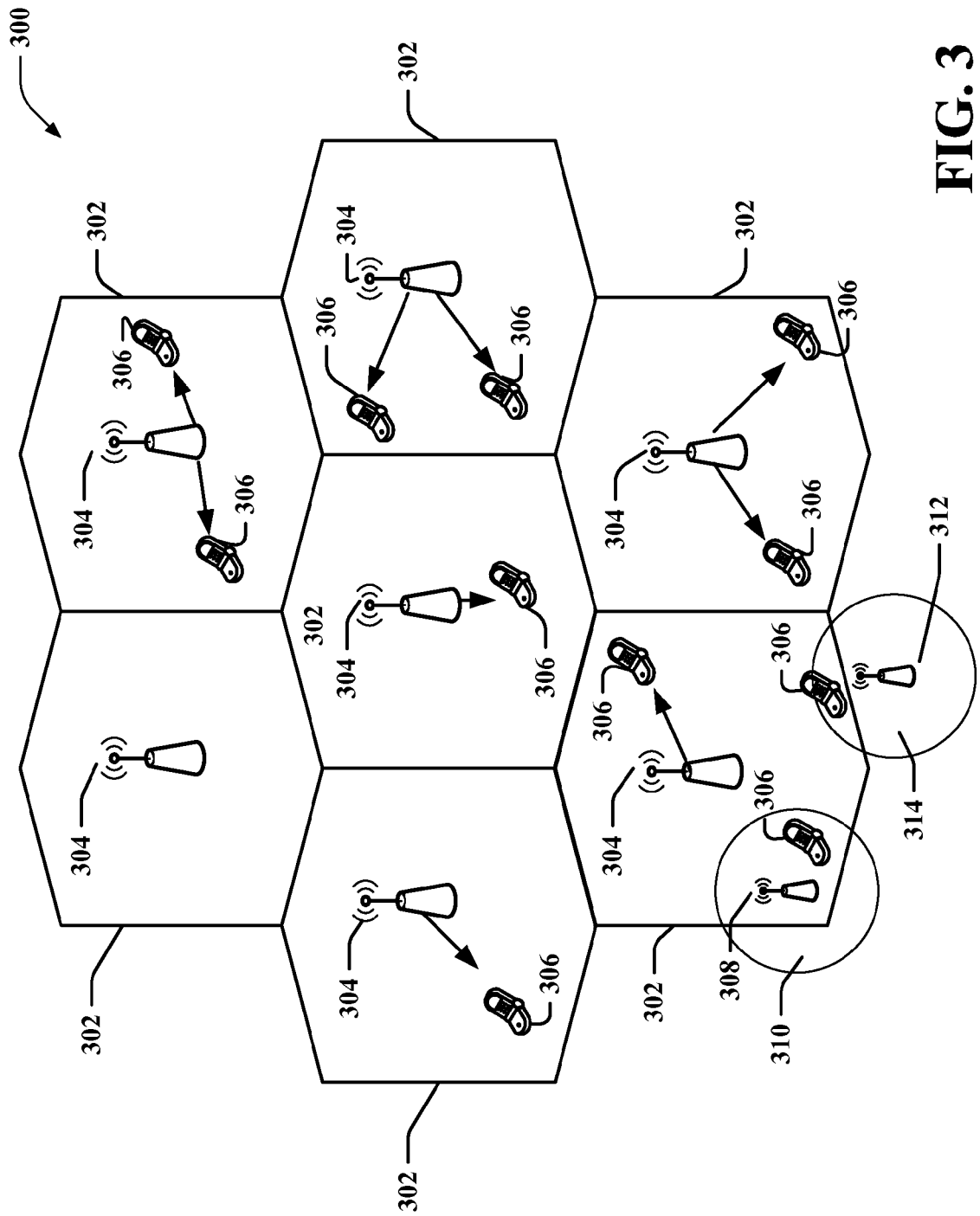
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 7:
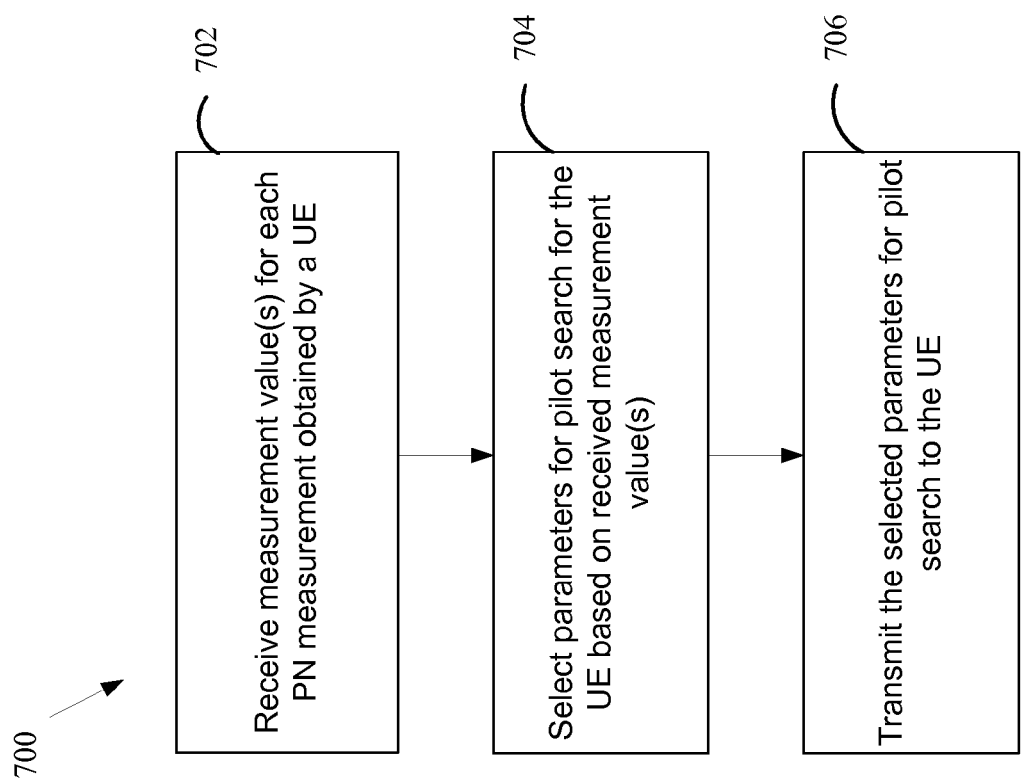
FIG. 7 is a flow chart of a method of wireless communication.

FIGS. 4, 5, and 7 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Generally, with respect to FIGS. 4 and 5, communications between a UE and an eNB may be supported using an LTE RAT with uplink and downlink information transfer. Further, communications between the eNB and a MME may be supported through an S1 interface and may provide for S1 cdma2000 tunneling. Still further, communications between the MME and an IWS may be supported through an S102 interface and may provide for A21 interface signaling.

FIG. 4 illustrates a call flow diagram flowchart describing a system 400 for providing optimal window sizing for inter RAT communications. System 400 includes a UE 402, such as UE 202, eNB 404, such as eNB 206, MME 406, such as MME 212, IWS 408, such as IWS 232, 1xMSC 410, such as 1xMSC 234, and a 1xBS 412 such as base station 236.

At act 414, eNB 404 may store search window sizes for 1x pilot PNs. At act 416, a voice call may be originated by UE 402. In response to the voice call origination, UE 402 may communicate with MME 406 and perform an extended service request at act 418. At act 420, MME 406 performs initial context setup, for example, for 1x CSFB. At act 422, UE 402 performs measurements and reports the measurement results to eNB 404. In one aspect, eNB 404 may set the window sizes among PNs stored at act 414 to maximum values in the measurement object.

At act 424, eNB 404 transmits a handover preparation request to UE 402. At acts 426b and 426c search window information is transmitted to IWS 408. In one aspect, where the 1x pilot measurement is performed for 1xCSFB, UE 402 communicates the 1x pilot measurement results in a Pilot List information element (IE). When eNB 404 sends the Pilot List IE in UL C2K Tunneling message, eNB 404 includes the window size stored at act 414 for each Pilot associated with reported PN in the Pilot List IE. At act 430, IWS 408 communicates with 1xMSC 410 to setup the handover. In one aspect, such communications include a service request transmission to 1xMSC 410 and an assignment request from 1xMSC 410 to IWS 408.

At act 432, IWS 408 determines search window values. In one aspect, when IWS 408 assigns a channel or channels, it determines the window sizes based on the information provided by eNB 404. At acts 434a, 434b, and 434c the window size values are communicated to UE 402. In one aspect, IWS 408 communicates the window sizes (e.g., search window for active and candidate set, search window for neighbor set, search window for remaining set, etc.) in the 1x Universal Handoff Direction Message (UHDM) along with assigned PN(s). At act 436, UE 402 communicates with 1xBS 412 using the search window size in UHDM according to 1x native operations.

FIG. 5 illustrates a call flow diagram flowchart describing a system 500 for providing optimal window sizing for inter RAT communications. System 500 includes a UE 502, such as UE 202, eNB 504, such as eNB 206, MME 506, such as MME 212, IWS 508, such as IWS 232, 1xMSC 510, such as 1xMSC 234, and a 1xBS 512 such as base station 236.

At act 514, a voice call may be originated by UE 502. In response to the voice call origination, UE 502 may communicate with MME 506 and perform an extended service request at act 516. At act 518, MME 506 performs initial context setup, for example, for 1x CSFB.

At act 520, eNB 504 may configure a measurement object to prompt the UE report both Pilot Strength and Pilot PN Phase in the measurement report. At act 522, UE 502 performs measurements and reports the measurement results to eNB 504.

At act 524, eNB 504 transmits a handover preparation request to UE 502. At acts 526b and 526c pilot PN phase information is transmitted to IWS 508. In one aspect, at act 526a, eNB 504 receives the UL handover preparation transfer containing GCSNA encapsulated 1x Origination Message, then at acts 526b and 526c the GCSNA encapsulated 1x Origination Message is forwarded, along with the measurement results (e.g., A21 Pilot List IE). The A21 Pilot List IE includes the measured Pilot Strength and Pilot PN phase for each PN. At act 530, IWS 508 communicates with 1xMSC 510 to setup the handover. In one aspect, such communications include a service request transmission to 1xMSC 510 and an assignment request from 1xMSC 510 to IWS 508.

At act 532, IWS 508 determines search offset values. In one aspect, IWS 508 determines the search offset values (e.g., SRCH_OFFSET) based on the reported Pilot PN Phase as appropriate. For example, SRCH_OFFSET may be set if the peak phase of a measured pilot exceeds a threshold value. At acts 534a, 534b, and 534c the search window size and search offset values are communicated to UE 502. In one aspect, IWS 508 communicates the offset values in the 1x UHDM along with assigned PN(s). At act 536, UE 502 communicates with 1xBS 512 using the search offset in the UHDM according to 1x native operations.

Figure 6:
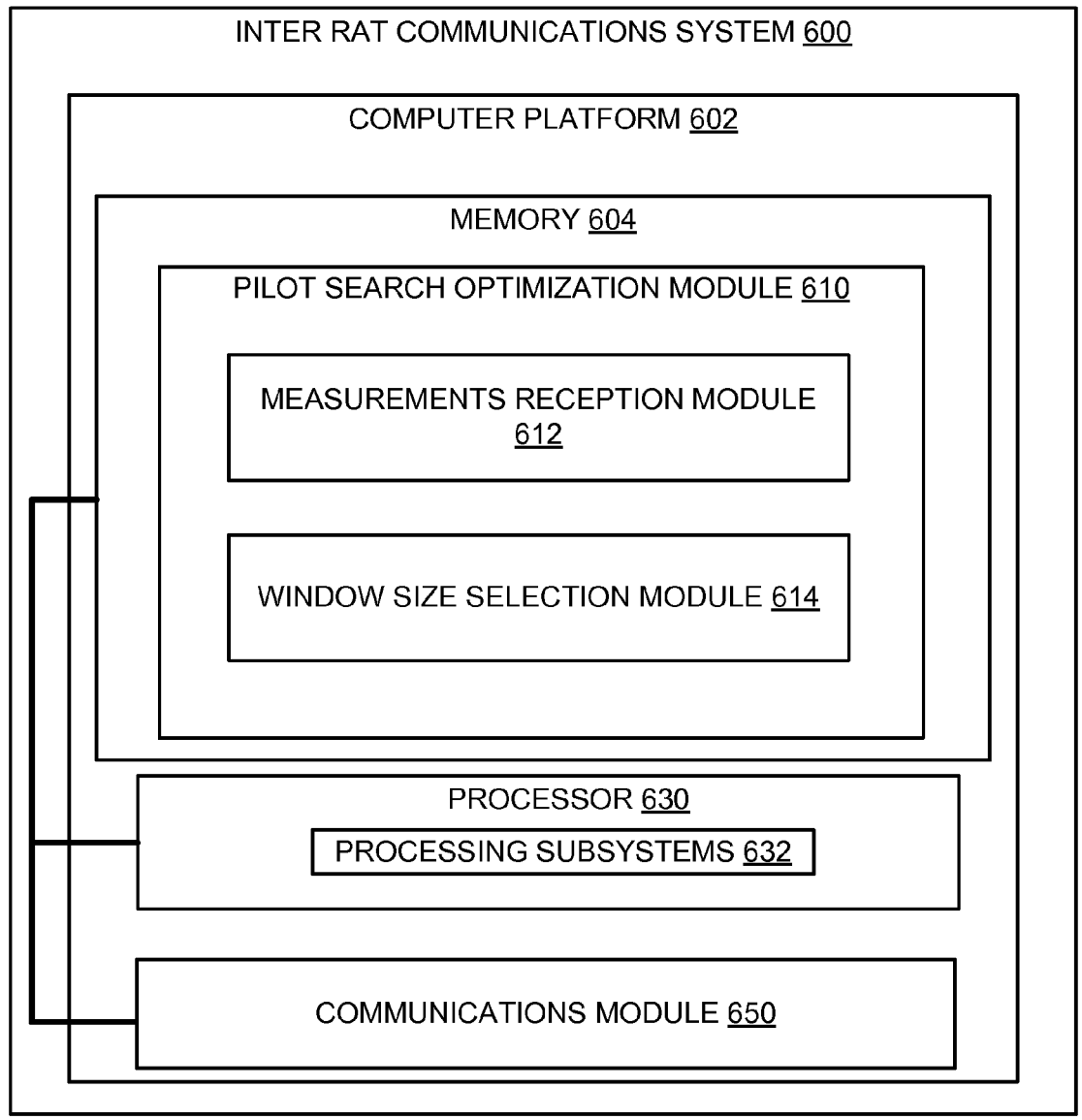
FIG. 6 is an example block diagram of an inter RAT communications system according to an aspect.

FIG. 6 illustrates a detailed block diagram of inter RAT communications system 600, such as IWS server 232 depicted in FIG. 2. Inter RAT communications system 600 may include at least one of any type of hardware, server, personal computer, mini computer, mainframe computer, or any computing device either special purpose or general computing device. Further, the modules and applications described herein as being operated on or executed by content system 600 may be executed entirely on a single network device, as shown in FIG. 6, or alternatively, in other aspects, separate servers, databases or computer devices may work in concert to provide data in usable formats to parties, and/or to provide a separate layer of control in the data flow between devices, such as UE 202, mobile station 238, etc., and the modules and applications executed by inter RAT communications system 600.

Inter RAT communications system 600 includes computer platform 602 that can transmit and receive data across wired and wireless networks, and that can execute routines and applications. Computer platform 602 includes memory 604, which may comprise volatile and nonvolatile memory such as read-only and/or random-access memory (ROM and RAM), EPROM, EEPROM, flash cards, or any memory common to computer platforms. Further, memory 604 may include one or more flash memory cells, or may be any secondary or tertiary storage device, such as magnetic media, optical media, tape, or soft or hard disk. Further, computer platform 602 also includes processor 630, which may be an application-specific integrated circuit ("ASIC"), or other chipset, logic circuit, or other data processing device. Processor 630 may include various processing subsystems 632 embodied in hardware, firmware, software, and combinations thereof, that enable the functionality of inter RAT communications system 600 and the operability of the network device on a wired or wireless network.

In one aspect, processor 630 and/or communications module 650 may provide means for receiving a message including at least one measurement value for each 1x pilot PN in a 1x network, obtained from measurements requested by an eNB and performed by a UE. Processor 630 and/or pilot search optimization module 610 may further provide means for selecting one or more parameters based on the at least one measurement value for the UE to use for pilot searching in the 1x network. Processor 630 and/or communications module 650 may further provide means for transmitting the selected one or more parameters for pilot search to the UE for pilot searching in the 1x network.

Computer platform 602 further includes communications module 650 embodied in hardware, firmware, software, and combinations thereof, that enables communications among the various components of inter RAT communications system 600, as well as between inter RAT communications system 600, and UE 202. Communication module 650 may include the requisite hardware, firmware, software and/or combinations thereof for establishing a wireless communication connection. According to described aspects, communication module 650 may include the necessary hardware, firmware and/or software to facilitate wireless and/or wireline communication between IWS 232 and UE 202.

Memory 604 of inter RAT communications system 600 includes a pilot search optimization module 610 which may be operable optimize window size selection for inter RAT communications. In one aspect, inter RAT communications system 600 may include measurements reception module 612, and window size selection module 616. Window size selection module 614 may determine optimal parameters for pilot search for the UE. In one aspect, the parameters for pilot search may be window sizes for each available cell. In another aspect, the parameters for pilot search may be a pilot PN phase shift value for each available cell.

In one operational aspect, measurements reception module 612 may receive various measurements values from an eNBs. In one aspect, the eNB may store a window size value for each PN. The eNB may then set the maximum of the window sizes among stored PNs in the measurement object. In one aspect, if 1x pilot measurement is performed for 1xCSFB, the UE may send the 1x pilot measurement results in a Pilot List information element (IE). Measurements reception module 612 may receive the Pilot List IE in an uplink (UL) C2K Tunneling message through the MME. Such a message may include window sizes set based on stored information in eNB for each Pilot associated with reported PN in the Pilot List IE. Thereafter, when the inter RAT communications system 600 assigns a channel or channels, window size selection module 614 determines windows size based on the information provided by the eNB. The inter RAT communications system 600 communicates the window sizes (e.g., search window for active and candidate set, search window for neighbor set, search window for remaining set, etc.) in a 1x UHDM along with assigned PN(s). IN operation, the UE may use the values received in the UHDM according to 1x native operation.

In another operational aspect, when a 1x voice call is triggered (e.g., a mobile origination 1x call), a UE may perform an Extended Service Request. In such an operational aspect, the eNB may configure the measurement object to prompt the UE report both Pilot Strength and Pilot PN Phase in the measurement report. Measurements reception module 612 may at least a portion on the measured values. For example, when the eNB receives a UL handover Prep Transfer containing a GCSNA encapsulated 1x Origination Message, the eNB forwards and measurements reception module 612 receives the GCSNA encapsulated 1x Origination Message along with the measurement results (e.g., A21 Pilot List IE). In operation, an A21 Pilot List IE contains measured Pilot PN phase values for each PN. The window size selection module 614 may determine search offset values (e.g., SRCH_OFFSET) based on the reported Pilot PN Phase as appropriate. For example, a search offset value may set if the peak phase of measured pilot exceeds a threshold value. The inter RAT communications system 600 communicates a UHDM to the UE and the UE uses the search offset value (e.g., SRCH_OFFSET) as defined in 1x standard.

In another operational aspect, measurements reception module 612 may receive both search offset and search window sizes. In such an aspect, window size selection module 614 may determine parameters for pilot search based on both received values.

In another operational aspect, inter RAT communications system 600 communicates a general neighbor list message (GNLM) along with the UHDM to inform the UE of detailed information related to search window size. In such an aspect, the combined GNLM and UHDM allows for efficient neighbor search by the UE. The information in a GNLM may be configured using the measurement results reported by eNB.

Figure 8:
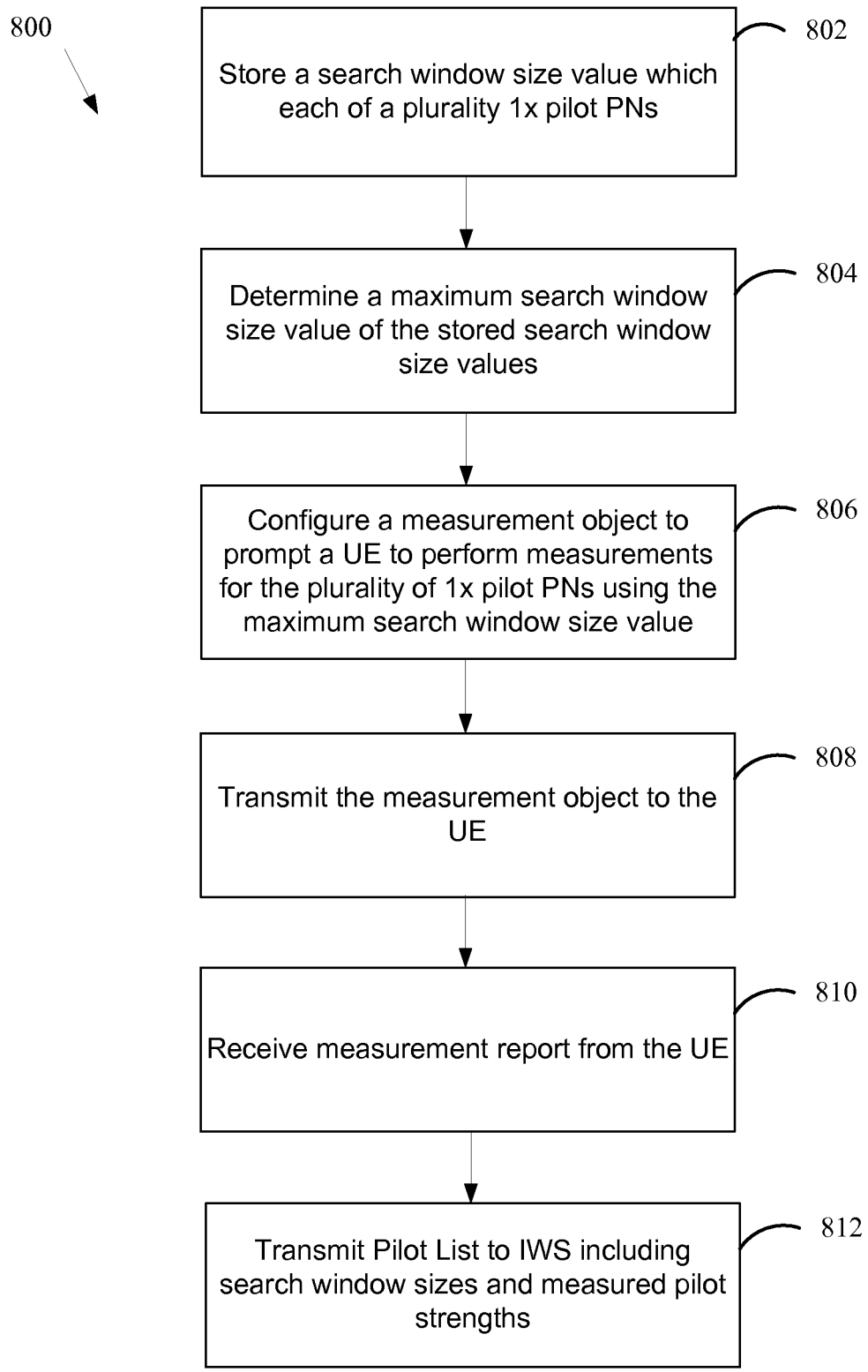
FIG. 8 is a flow chart of another method of wireless communication.

FIGS. 7 and 8 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 is a flow chart 700 of a method for determining optimal window size selection for a UE from an independent IWS.

Generally, an eNB may hold various parameters per PN, such as window size, and PN phase. In one aspect, the eNB may set the max of the window sizes among PNs in a measurement object. In another aspect, the eNB may configure the measurement object to make the UE report Pilot PN Phase in the measurement report. If 1x pilot measurement is performed by the UE for 1xCSFB, the UE sends the 1x pilot measurement results in the Pilot List information element.

At block 702, the IWS receives measurement values for each PN measurement reported by the UE. In one aspect, the eNB sent UL C2K Tunneling message Pilot List IE is received by the IWS. In another aspect, the Pilot List IE includes the window size for each Pilot. In another aspect, the eNB forwards a GCSNA encapsulated 1x Origination Message along with the measurement results including the measured Pilot PN phase for each PN for reception by the IWS.

At block 704, when the IWS selects parameters for pilot search for the UE based on the received measurement values. In one aspect, the IWS may assign a channel or channels, and determine parameters for use during 1x CSFB based on the information provided by the eNB. In another aspect, the IWS determines a search offset value (e.g., SRCH_OFFSET) based on the reported Pilot PN Phase as appropriate. For example, SRCH_OFFSET is set if the peak phase of measured pilot exceeds a threshold. In another aspect, the parameters for pilot search may be determined based on a combination of received search offset and window size values.

At block 706, the IWS transmits the selected parameters for pilot search to the UE. In one aspect, the transmission may include any combination of window sizes (e.g., search window for active and candidate set, search window for neighbor set, search window for remaining set, etc.) and search offset values in the 1x UHDM along with assigned PN(s). The UE may use the received parameter(s) (e.g., Search Window Size, search offset) according to 1x native operation.

FIG. 8 is a flow chart 800 of a method for providing an independent IWS with optimal window sizes for a UE.

At block 802, an eNB may store a search window size value which each of a plurality 1x pilot PNs. For example, an eNB may store search window size values for PN1, PN2 and PN3 as 1, 2, and 3 respectively. At block 804, the eNB may determine a maximum search window size value of the stored search window size values. In the described example, the maximum search window size value may be 3. At block 806, the eNB configures a measurement object to prompt a UE to perform measurements for the plurality of 1x pilot PNs using the maximum search window size value. In the described example, when the eNB configures the measurement object, it uses 3 as a search window size and prompts the UE to measure PNs. At block 808, the eNB transmits the measurement object to the UE. Thereafter, the UE may use search window size 3 for measurement for PNs. At block 810, the eNB receives a measurement report e.g., including results for PN1, PN2 and PN3 from UE. At block 812, the eNB generates and transmits a pilot list message and includes search window sizes based on the stored information (e.g., the Pilot List IE includes Pilot Strength for PN1 with search window size 1, Pilot Strength for PN2 with search window size 2 and Pilot Strength for PN3 with search window size 3.)

Figure 9:
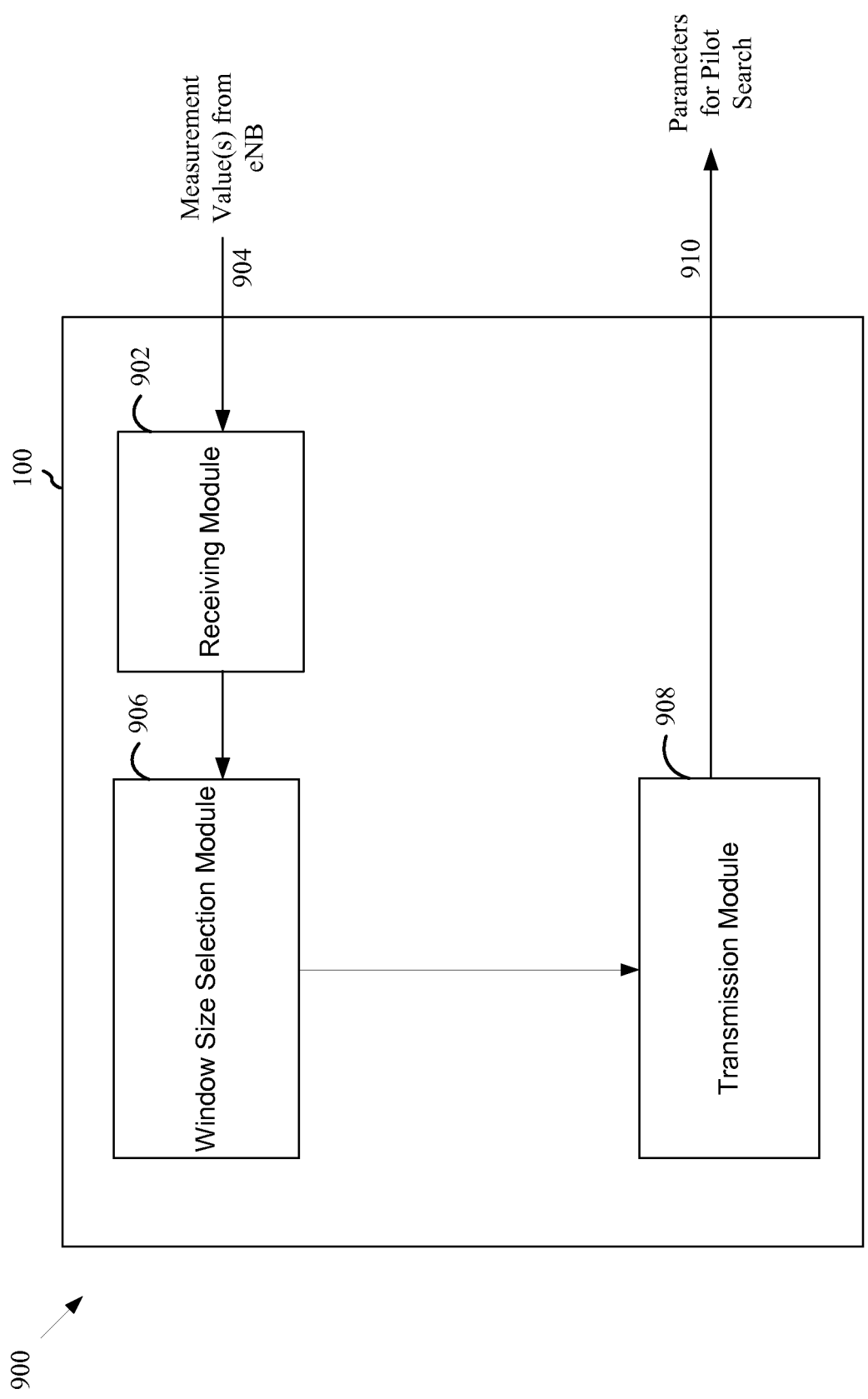
FIG. 9 is a conceptual block diagram illustrating the functionality of an example apparatus.

FIG. 9 is a conceptual block diagram 900 illustrating the functionality of an exemplary apparatus 100. The apparatus 100 includes a module 902 that receives a message including at least one measurement value 904 for each 1x pilot PN in a 1x network, obtained from measurements requested by an eNB and performed by a UE, a module 906 that selects one or more parameters 910 based on the at least one measurement value 904 for the UE to use for pilot searching in the 1x network, and a module 908 that transmits the selected one or more parameters for pilot search 910 to the UE for pilot searching in the 1x network. The apparatus 100 may include additional modules that perform each of the steps in the aforementioned flow charts. As such, each step in the aforementioned flow charts may be performed by a module and the apparatus 100 may include one or more of those modules.

In one configuration, the apparatus 100 for wireless communication includes means for selecting at least one of an optimal search window size or an optimal search offset value. The apparatus 100 for wireless communication further includes means for determining a search window size for each active and candidate 1x PN, means for determining a search window size for a neighbor set in the 1x network, and means for determining a search window for each remaining set in the 1x network. The apparatus 100 for wireless communication further includes means for determining that the at least one measurement value exceeds a threshold phase value, and means for determining the optimal search offset value based on a peak phase value of the at least one measurement value. The apparatus 100 for wireless communication further includes means for receiving the message using an uplink C2K tunneling message. In one configuration, the apparatus 100 for wireless communication further includes means for transmitting the selected one or more fallback values using a GCSNA (UHDM) message. In another configuration, the apparatus 100 for wireless communication further includes means for receiving the at least one measurement value using a pilot channel information element.

The aforementioned means may be one or more of the aforementioned modules of the apparatus 100 (see FIG. 6) and/or the processing system 114 configured to perform the functions recited by the aforementioned means. As described supra, the processing system 114 includes processor 630. As such, in one configuration, the aforementioned means may be the processor 630 configured to perform the functions recited by the aforementioned means.

Figure 10:
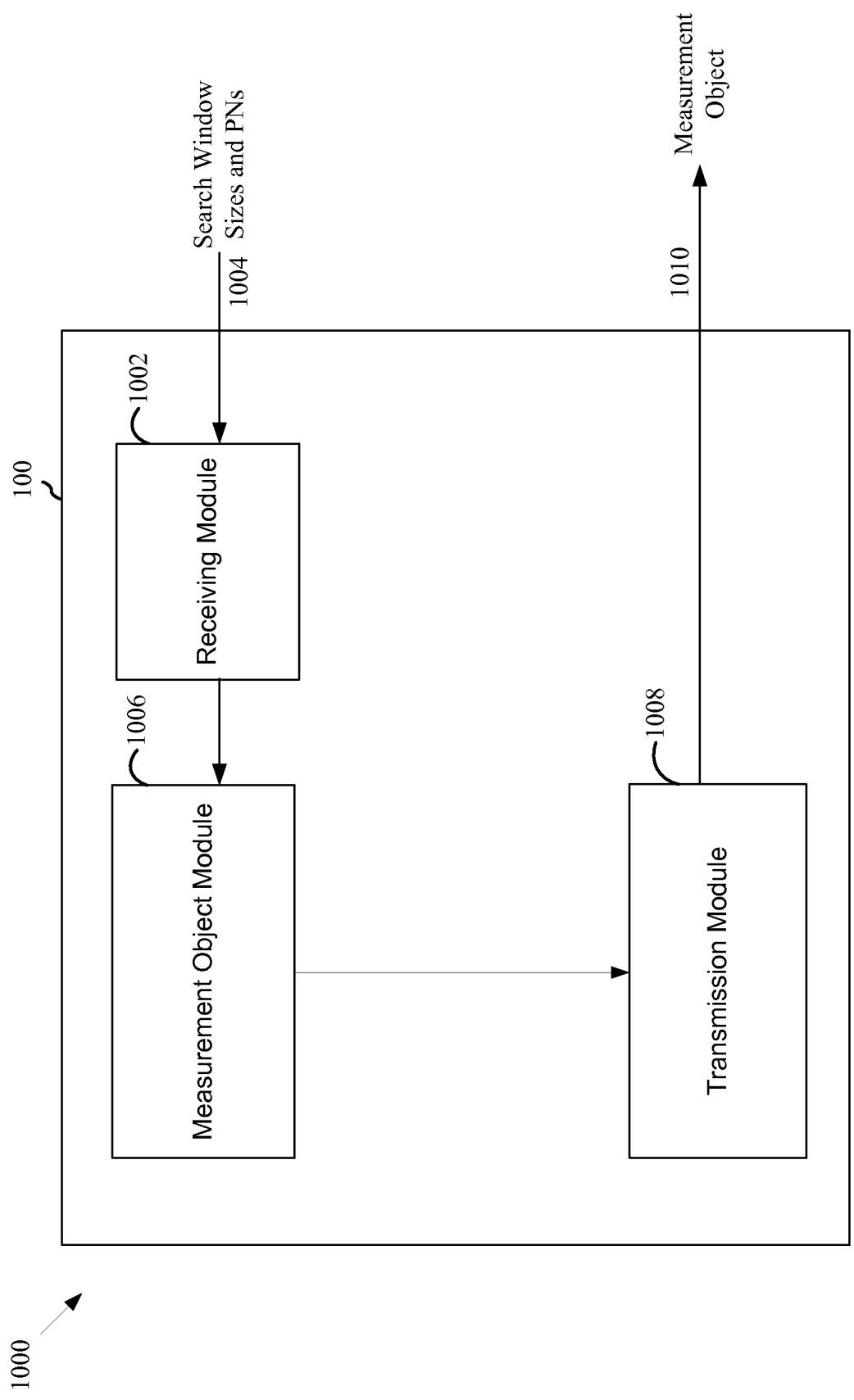
FIG. 10 is a conceptual block diagram illustrating the functionality of another example apparatus.

FIG. 10 is a conceptual block diagram 1000 illustrating the functionality of an exemplary apparatus 100. The apparatus 100 includes a module 1002 that receives and/or stores a search window size values for each of a plurality of 1x pilot PNs 904, a measurement object module 1006 that generates a measurement object using a maximum search window size value, and a transmission module 1008 that transmits the generated measurement object 1010 to the UE to prompt to the UE to perform measurements. The apparatus 100 may include additional modules that perform each of the steps in the aforementioned flow charts. As such, each step in the aforementioned flow charts may be performed by a module and the apparatus 100 may include one or more of those modules.

In one configuration, the apparatus 100 for wireless communication includes means for receiving a measurement report from the UE in response to the transmitted measurement object, wherein the measurement report includes a pilot strength value associated with each of the plurality of 1x pilot PNs, means for generating a pilot list message including the pilot strength values and the stored search window size values for each of the plurality of 1x pilot PNs, and means for transmitting the pilot list message to a IWS. The apparatus 100 for wireless communication further includes means for transmitting the pilot list message using an uplink C2K tunneling message.

The aforementioned means may be one or more of the aforementioned modules of the apparatus 100 (see FIG. 2, eNodeB 206) and/or the processing system 114 configured to perform the functions recited by the aforementioned means. As described supra, the processing system 114 includes eNodeB 206. As such, in one configuration, the aforementioned means may be eNodeB 206 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications, comprising:
   receiving, by an interworking solution (IWS) in a 1x network, a message from an evolved nodeB (eNB) in an Evolved Packet System (EPS) in response to a request to setup a handover, wherein the message including at least one measurement value for each 1x pilot pseudo-noise (PN) in the 1x network, obtained from measurements requested by the eNB and performed by a user equipment (UE);
   communicating with a Mobile Switching Center (MSC) to setup the handover in response to receiving the message, wherein the communicating further includes:
      transmitting a service request message to the MSC in response to receiving the message including the at least one measurement value for each 1x pilot PN; and
      receiving an assignment request message from the MSC in response to transmitting the service request message;
   selecting one or more parameters for pilot search based on the at least one measurement value for the UE to use for pilot searching in the 1x network; and
   transmitting the selected one or more parameters for pilot search to the UE for pilot searching in the 1x network.

2. The method of claim 1, wherein the at least one measurement value comprises at least one of:
   a search window size for each 1x pilot PN; or
   a pilot PN phase value, wherein the pilot PN phase value is used to determine a search offset window.

3. The method of claim 2, wherein the search window size used for measurement is selected as a maximum search window size stored by the eNB.

4. The method of claim 1, wherein the selecting further comprises selecting at least one of:
   an optimal search window size; or
   an optimal search offset value.

5. The method of claim 4, wherein the selecting the optimal search window size further comprises:
   determining a window size for each active and candidate 1x PN;
   determining a search window size for a neighbor set in the 1x network; and
   determining a search window for each remaining set in the 1x network.

6. The method of claim 4, wherein the at least one measurement value is a pilot PN phase value, and wherein the selecting the optimal search offset value further comprises:
   determining that the at least one measurement value exceeds a threshold phase value; and
   determining the optimal search offset value based on a peak phase value of the at least one measurement value.

7. The method of claim 1, wherein the receiving further comprises receiving the message using an uplink C2K tunneling message.

8. The method of claim 1, wherein the transmitting further comprises transmitting the selected one or more parameters for pilot search using a handoff direction message.

9. The method of claim 8, wherein the transmitting further comprises transmitting the selected one or more parameters for pilot search using a message for providing neighbor list with a handoff direction message.

10. The method of claim 1, wherein the IWS and a base station are geographically separated entities.

11. The method of claim 1, wherein the method comprises a circuit switched fallback (CSFB) procedure, and wherein the receiving further comprises receiving the at least one measurement value using a pilot channel information element.

12. The method of claim 1, wherein the method comprises an evolved high rate packet data (eHRPD) optimized handover.

13. An apparatus for wireless communication, comprising:
   means for receiving, a message from an evolved nodeB (eNB) in an Evolved Packet System (EPS) in response to a request to setup a handover, at an interworking solution (IWS) in a 1x network, wherein the message including at least one measurement value for each 1x pilot PN in the 1x network, obtained from measurements requested by the eNB and performed by a user equipment (UE);

means for communicating with a Mobile Switching Center (MSC) to setup the handover in response to receiving the message, wherein the means for communicating further includes:
   means for transmitting a service request message to the MSC in response to receiving the message including the at least one measurement value for each 1x pilot PN; and
   means for receiving an assignment request message from the MSC in response to transmitting the service request message;

means for selecting one or more parameters for pilot search based on the at least one measurement value for the UE to use for pilot searching in the 1x network; and means for transmitting the selected one or more parameters for pilot search to the UE for pilot searching in the 1x network.

14. A computer program product, comprising:
a non-transitory computer-readable medium comprising code for:
receiving, by an interworking solution (IWS) in a 1x network, a message from an evolved nodeB (eNB) in an Evolved Packet System (EPS) in response to a request to setup a handover, wherein the message including at least one measurement value for each 1x pilot PN in the 1x network, obtained from measurements requested by the eNB and performed by a user equipment (UE);
communicating with a Mobile Switching Center (MSC) to setup the handover in response to receiving the message, wherein the communicating further includes:
   transmitting a service request message to the MSC in response to receiving the message including the at least one measurement value for each 1x pilot PN; and
   receiving an assignment request message from the MSC in response to transmitting the service request message;
selecting one or more parameters based on the at least one measurement value for the UE to use for pilot searching in the 1x network; and
transmitting the selected one or more parameters for pilot search to the UE for pilot searching in the 1x network.

15. An apparatus for wireless communication, comprising:
a processing system configured to:
   receive, by an interworking solution (IWS) in a 1x network, a message from an evolved nodeB (eNB) in an Evolved Packet System (EPS) in response to a request to setup a handover, wherein the message including at least one measurement value for each 1x pilot PN in the 1x network, obtained from measurements requested by the eNB and performed by a user equipment (UE);
   communicate with a Mobile Switching Center (MSC) to setup the handover in response to receiving the message, wherein the processing system is further configured to:
      transmit a service request message to the MSC in response to receiving the message including the at least one measurement value for each 1x pilot PN; and
      receive an assignment request message from the MSC in response to transmitting the service request message;
   select one or more parameters for pilot search based on the at least one measurement value for the UE to use for pilot searching in the 1x network; and
   transmit the selected one or more parameters for pilot search to the UE for pilot searching in the 1x network.

16. The apparatus of claim 15, wherein the at least one measurement value comprises at least one of:
   a search window size for each 1x pilot PN; or
   a pilot PN phase value, wherein the pilot PN phase value is used to determine a search offset window.

17. The apparatus of claim 16, wherein the search window size used for measurement is selected as a maximum search window size stored by the eNB.

18. The apparatus of claim 15, wherein the processing system is further configured to select at least one of:
   an optimal search window size; or
   an optimal search offset value.

19. The apparatus of claim 15, wherein the processing system is further configured to:
   determine a window size for each active and candidate 1x PN;
   determine a search window size for a neighbor set in the 1x network; and
   determine a search window for each remaining set in the 1x network.

20. The apparatus of claim 15, wherein the at least one measurement value is a pilot PN phase value, and wherein the processing system is further configured to:
   determine that the at least one measurement value exceeds a threshold phase value; and
   determine the optimal search offset value based on a peak phase value of the at least one measurement value.

21. The apparatus of claim 15, wherein the wherein the processing system is further configured to receive the message using an uplink C2K tunneling message.

22. The apparatus of claim 15, wherein the processing system is further configured to transmit the selected one or more parameters for pilot search using a handoff direction message.

23. The apparatus of claim 22, wherein the processing system is further configured to transmit the selected one or more parameters for pilot search using a message for providing neighbor list with a handoff direction message.

24. The apparatus of claim 15, wherein the IWS and a base station are geographically separated entities.

25. The apparatus of claim 15, wherein the apparatus is operable to perform a CSFB procedure, and wherein the processing system is further configured to receive the at least one measurement value using a pilot channel information element.

26. The apparatus of claim 15, wherein the apparatus is operable to perform an eHRPD optimized handover.

27. A method of wireless communications, comprising:
storing, by an evolved nodeB (eNB), a plurality of search window size values that each correspond to one of a plurality 1x pilot PNs;
determining a maximum search window size value from the plurality of stored search window size values;
configuring a measurement object to prompt a user equipment (UE) to perform measurements for the plurality of 1x pilot PNs using the maximum search window size value; and
transmitting a handover preparation request comprising the measurement object to the UE, wherein the handover preparation request causes an interworking solution (IWS) to communicate with a Mobile Switching Center (MSC) to setup a handover, wherein the handover preparation request further causes the IWS to transmit a service request message to the MSC in response to receiving the message including the at least one measurement value for each 1x pilot PN and receive an assignment request message from the MSC in response to transmitting the service request message.

28. The method of claim 27, further comprising:
receiving a measurement report from the UE in response to the transmitted measurement object, wherein the measurement report includes a pilot strength value associated with each of the plurality of 1x pilot PNs;
generating a pilot list message including the pilot strength values and the stored search window size values for each of the plurality of 1x pilot PNs; and
transmitting the pilot list message to the IWS.

29. The method of claim 28, wherein the transmitting further comprises transmitting the pilot list message using an uplink C2K tunneling message.

30. An apparatus for wireless communication, comprising:
means for storing, a plurality of search window size values at an evolved nodeB (eNB), wherein the plurality of search window size values each correspond to one of a plurality 1x pilot PNs;
means for determining a maximum search window size value from the plurality of stored search window size values;
means for configuring a measurement object to prompt a user equipment (UE) to perform measurements for the plurality of 1x pilot PNs using the maximum search window size value; and
means for transmitting a handover preparation request comprising the measurement object to the UE, wherein the handover preparation request causes an interworking solution (IWS) to communicate with a Mobile Switching Center (MSC) to setup a handover, wherein the handover preparation request further causes the IWS to transmit a service request message to the MSC in response to receiving the message including the at least one measurement value for each 1x pilot PN and receive an assignment request message from the MSC in response to transmitting the service request message.

31. A computer program product, comprising:
a non-transitory computer-readable medium comprising code for:
storing, by an evolved nodeB (eNB), a plurality of search window size values that each correspond to one of a plurality 1x pilot PNs;
determining a maximum search window size value from the plurality of stored search window size values;
configuring a measurement object to prompt a user equipment (UE) to perform measurements for the plurality of 1x pilot PNs using the maximum search window size value; and
transmitting a handover preparation request comprising the measurement object to the UE, wherein the handover preparation request causes an interworking solution (IWS) to communicate with a Mobile Switching Center (MSC) to setup a handover, wherein the handover preparation request further causes the IWS to transmit a service request message to the MSC in response to receiving the message including the at least one measurement value for each 1x pilot PN and receive an assignment request message from the MSC in response to transmitting the service request message.

32. An apparatus for wireless communication, comprising:
a processing system configured to:
store, by an evolved nodeB (eNB), a plurality of search window size values that each correspond to one of a plurality 1x pilot PNs;
determine a maximum search window size value from the plurality of stored search window size values;
configure a measurement object to prompt a user equipment (UE) to perform measurements for the plurality of 1x pilot PNs using the maximum search window size value; and
transmit a handover preparation request comprising the measurement object to the UE, wherein the handover preparation request causes an interworking solution (IWS) to communicate with a Mobile Switching Center (MSC) to setup a handover, wherein the handover preparation request further causes the IWS to transmit a service request message to the MSC in response to receiving the message including the at least one measurement value for each 1x pilot PN and receive an assignment request message from the MSC in response to transmitting the service request message.

33. The apparatus of claim 32, wherein the processing system is further configured to:
receive a measurement report from the UE in response to the transmitted measurement object, wherein the measurement report includes a pilot strength value associated with each of the plurality of 1x pilot PNs; and
generate a pilot list message including the pilot strength values and the stored search window size values for each of the plurality of 1x pilot PNs; and
transmit the pilot list message to the IWS.

34. The apparatus of claim 33, wherein the processing system is further configured to transmit the pilot list message using an uplink C2K tunneling message.

* * * * *